(12) United States Patent
Yap et al.

(10) Patent No.: US 10,373,652 B2
(45) Date of Patent: Aug. 6, 2019

(54) DISK DRIVE COVER WITH SPRING FORCE COMPRESSION FEATURE

(71) Applicant: Seagate Technology LLC, Cupertino, CA (US)

(72) Inventors: Pow Ming Yap, Woodlands (SG); Ying Su, Punggol (SG); Kok Liang Cho, Melaka (MY); Jun Long Lim, Tampines (SG); Kyi Ayar Oo, Queenstown (SG); Chee Xian Lee, Tampines (SG); Xiangzhi Wang, Jurong (SG); Chuen Buan Lee, Katong (SG)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/809,548

(22) Filed: Nov. 10, 2017

(65) Prior Publication Data

US 2019/0147917 A1 May 16, 2019

(51) Int. Cl.
*G11B 33/14* (2006.01)

(52) U.S. Cl.
CPC ................. *G11B 33/1433* (2013.01)

(58) Field of Classification Search
None
See application file for complete search history.

(56) References Cited

U.S. PATENT DOCUMENTS

| | | | | |
|---|---|---|---|---|
| 4,646,193 | A * | 2/1987 | Gitzendanner | G11B 23/0316 360/133 |
| 5,696,648 | A * | 12/1997 | Jeong | G11B 33/1466 360/99.22 |
| 5,793,566 | A * | 8/1998 | Scura | G11B 33/1466 360/99.18 |
| 6,129,579 | A * | 10/2000 | Cox | G11B 5/4846 360/99.18 |
| 7,016,145 | B2 * | 3/2006 | Gunderson | G11B 25/043 360/99.18 |
| 7,137,196 | B2 * | 11/2006 | Gunderson | G11B 25/043 29/884 |
| 8,438,721 | B1 * | 5/2013 | Sill | G11B 25/043 29/603.03 |
| 8,870,507 | B1 | 10/2014 | Larson et al. | |
| 8,995,119 | B2 * | 3/2015 | Thijssen | B29C 45/14631 312/223.2 |
| 9,336,817 | B1 * | 5/2016 | Hirasawa | G11B 19/2009 |
| 9,508,393 | B1 | 11/2016 | Le et al. | |
| 2005/0168866 | A1 * | 8/2005 | Cho | G11B 17/0287 360/97.19 |
| 2005/0225039 | A1 * | 10/2005 | Seki | F16J 15/061 277/637 |
| 2007/0017685 | A1 * | 1/2007 | Moore | G11B 33/142 174/17 VA |

(Continued)

*Primary Examiner* — Binh B Tran
*Assistant Examiner* — Douglas R Burtner

(57) ABSTRACT

An apparatus includes a drive base. A drive cover overlies the drive base. A fastener secures the drive cover to the drive base. The fastener extends through the drive cover and into the drive base. A gasket is between the drive base and the drive cover. The gasket is compressed by the drive base and the drive cover. A spring feature is formed in the drive cover. The spring feature exerts a first force on the fastener and a second force on the base. The first force is opposite the second force.

17 Claims, 7 Drawing Sheets

(56) References Cited

U.S. PATENT DOCUMENTS

| | | | | |
|---|---|---|---|---|
| 2008/0112299 A1* | 5/2008 | Shimizu | ............ | G11B 33/1433 |
| | | | | 369/75.11 |
| 2009/0050365 A1* | 2/2009 | Moore | ................ | G11B 33/142 |
| | | | | 174/547 |
| 2009/0219640 A1* | 9/2009 | Tsuchida | ................ | G11B 33/08 |
| | | | | 360/69 |
| 2010/0296198 A1* | 11/2010 | Viskochil | ............... | G11B 21/22 |
| | | | | 360/254 |
| 2013/0222947 A1* | 8/2013 | Sugii | ................... | G11B 23/505 |
| | | | | 360/99.08 |

* cited by examiner

1100

POSITIONING A COVER OVER A BASE AND A GASKET BETWEEN THE COVER AND THE BASE, WHEREIN THE COVER INCLUDES A COVER FASTENER HOLE, AND THE COVER INCLUDES A SPRING REGION EXTENDING AWAY FROM THE BASE AROUND THE COVER FASTENER HOLE
1102

INSERTING A FASTENER TO A FIRST POSITION THROUGH THE COVER FASTENER HOLE AND INTO THE BASE, WHEREIN THE SPRING REGION REMAINS EXTENDING AWAY FROM THE BASE AND EXERTS A FORCE ON THE FASTENER, THE COVER AND THE BASE ARE IN OVERLYING CONTACT IN A CONTACT REGION AROUND THE SPRING REGION, AND THE INSERTING COMPRESSES THE GASKET TO A COMPRESSED HEIGHT
1104

FURTHER INSERTING THE FASTENER TO A SECOND POSITION THROUGH THE COVER FASTENER HOLE AND FURTHER INTO THE BASE, WHEREIN THE FURTHER INSERTING FLATTENS THE SPRING REGION AND BRINGS THE SPRING REGION OF THE COVER INTO OVERLYING CONTACT WITH THE BASE, AND THE COMPRESSED HEIGHT OF THE GASKET REMAINS THE SAME IN RESPONSE TO THE FURTHER INSERTING.
1106

FIG. 11

DISK DRIVE COVER WITH SPRING FORCE COMPRESSION FEATURE

SUMMARY

Provided herein is an apparatus that includes a drive base. A drive cover overlies the drive base. A fastener secures the drive cover to the drive base. The fastener extends through the drive cover and into the drive base. A gasket is between the drive base and the drive cover. The gasket is compressed by the drive base and the drive cover. A spring feature is formed in the drive cover. The spring feature exerts a first force on the fastener and a second force on the base. The first force is opposite the second force. These and other features and advantages will be apparent from a reading of the following detailed description.

BRIEF DESCRIPTION OF DRAWINGS

FIG. 11 shows an exemplary flow diagram according to one aspect of the present embodiments.

DESCRIPTION

Figure 1:
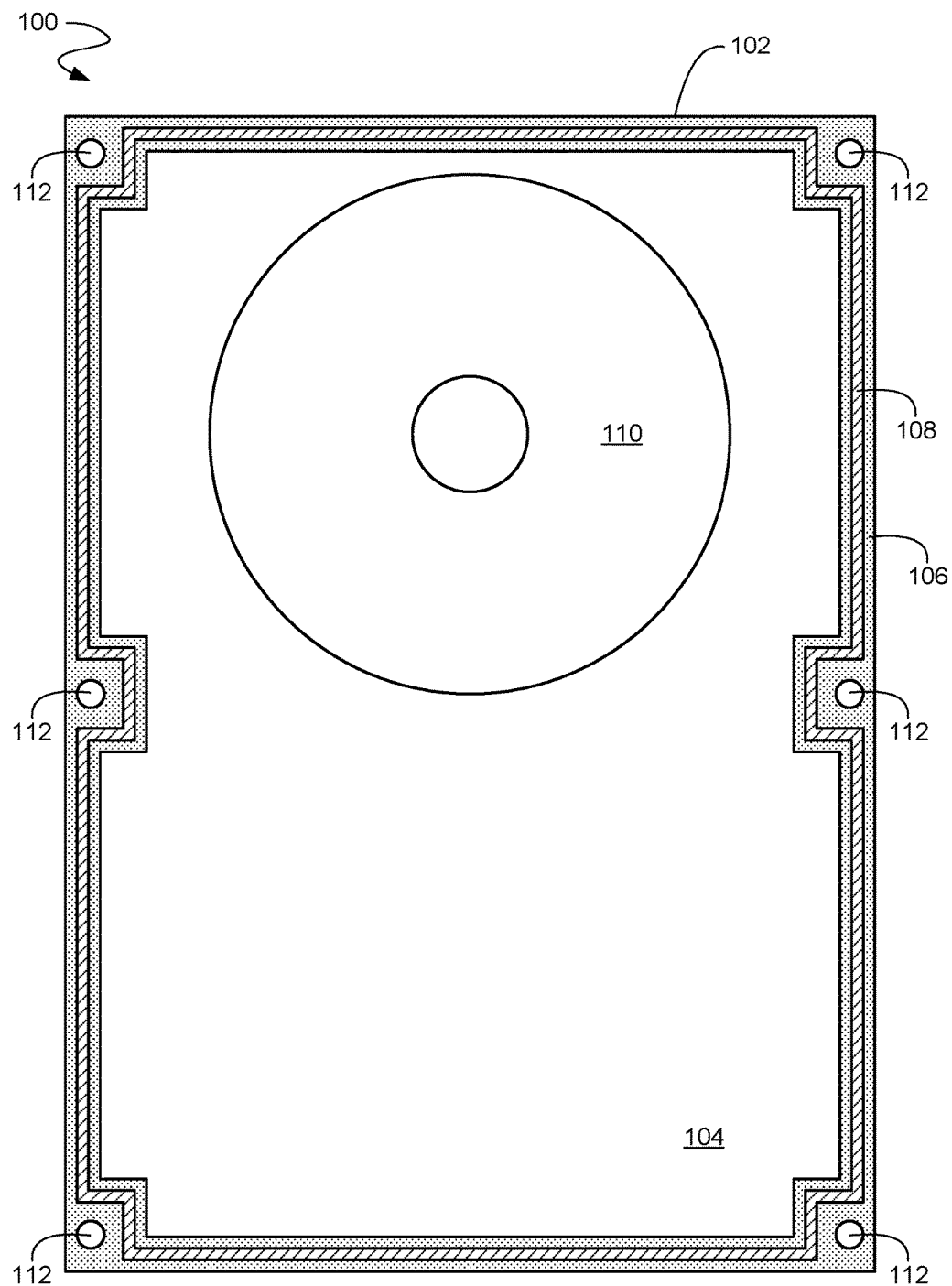
FIG. 1 shows a top view of a drive according to one aspect of the present embodiments.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "middle," "bottom," "beside," "forward," "reverse," "overlying," "underlying," "up," "down," or other similar terms such as "upper," "lower," "above," "below," "under," "between," "over," "vertical," "horizontal," "proximal," "distal," and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

Terms such as "over," "overlying," "above," "under," etc. are understood to refer to elements that may be in direct contact or may have other elements in-between. For example, two layers may be in overlying contact, wherein one layer is over another layer and the two layers physically contact. In another example, two layers may be separated by one or more layers, wherein a first layer is over a second layer and one or more intermediate layers are between the first and second layers, such that the first and second layers do not physically contact.

A hard disk drive ("HDD") may be subjected to a wide range of environmental conditions over a lifespan. Therefore, HDDs are tested during manufacture to evaluate robustness under various circumstances. One of the most extreme tests is the Thermal Shock Test, wherein the HDD is repeatedly and rapidly heated and cooled. One of the failure modes for the HDD as a result of the Thermal Shock Test is leakage caused by a dislodged or excessively bulging form-in place gasket ("FIPG").

The FIPG is pressed down and compressed between a disk drive cover and a disk drive base, that are secured together with a screw. A root cause of a dislodged or excessively bulging FIPG is the sudden expansion and contraction of the cover, screw, base, and FIPG during the Thermal Shock Test. One or more of the cover, screw, base, and FIPG may have different coefficients of thermal expansion, thereby causing different rates and different amounts of expansion and contraction. As a result, the screw may become loosened and unable to retain its torque. Hence, during the heating and cooling cycles there may be times when the FIPG is not pressed down effectively by the cover onto the base, thereby allowing the FIPG to shift, bulge, and leak.

Embodiments described herein maintain a uniform compression of the FIPG during thermal cycling by forming a spring region in the disk drive cover surrounding one or more screws. The spring region of the cover maintains a force on a screw that has become loosened in order to keep the cover in place and prevent a change in compression of the FIPG. As a result, the FIPG is constantly pressed down with a uniform and unchanging compression in all conditions including thermal shock.

Referring now to FIG. 1, a top view of a drive 100 is shown according to one aspect of the present embodiments.

The drive 100 includes a base 102, including a base deck 104 and a base sidewall 106. A gasket 108 (e.g. FIPG) extends along the base sidewall 106, surrounding a storage device 110. In the present embodiment, the storage device 110 is illustrated as a hard disk with a disc pack assembly. However, is understood that various embodiments may include any storage device such as solid state, heat assisted magnetic recording media, etc. Outside of the gasket 108, one or more fastener holes 112 (e.g. screw holes) may be located in the base sidewall 106. As such, the gasket 108 is positioned between the fastener holes 112 and the storage device 110. For clarity of illustration, a top cover and fasteners are not shown in FIG. 1.

Figure 2:
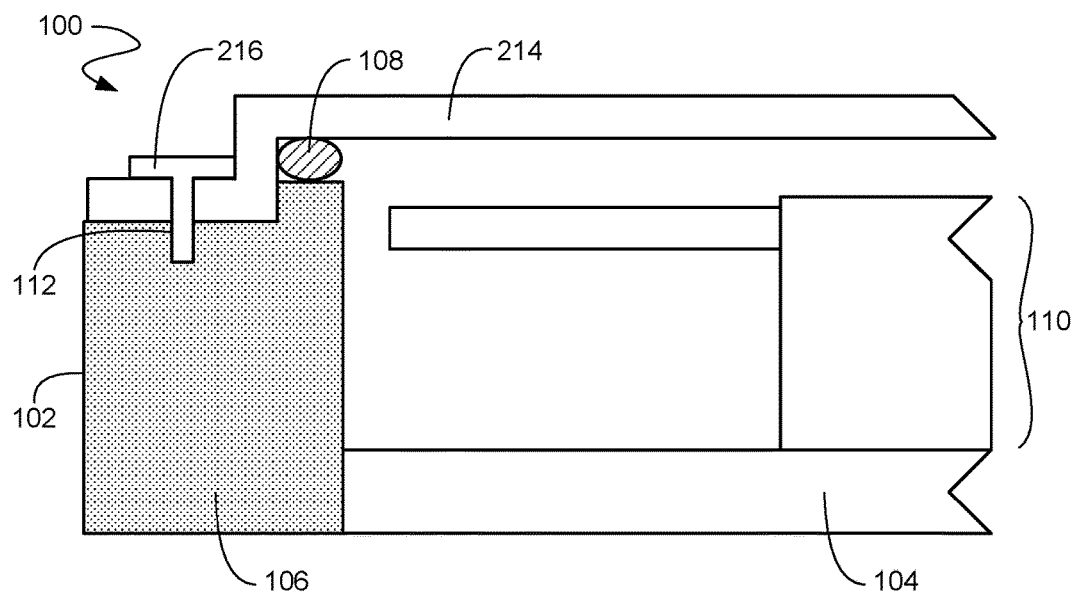
FIG. 2 shows a partial side view of the drive including a cover and a fastener according to one aspect of the present embodiments.

Referring now to FIG. 2, a partial side view of the drive 100 including a cover 214 and a fastener 216 is shown according to one aspect of the present embodiments. The cover 214 overlies the base 102, and the gasket 108 is between the cover 214 and the base 102. The fastener 216 (e.g. screw, nail, rivet, bolt, etc.) secures the cover 214 to the base 102. In various embodiments, more than one fastener may be used, as indicated in FIG. 1. The fastener 216 extends through the cover 214 and into the base 102. As will be described in greater detail below, the cover 214 includes a spring feature that exerts force on the fastener 216 thereby keeping the cover 214 and the base 102 pressed together.

Figure 3:
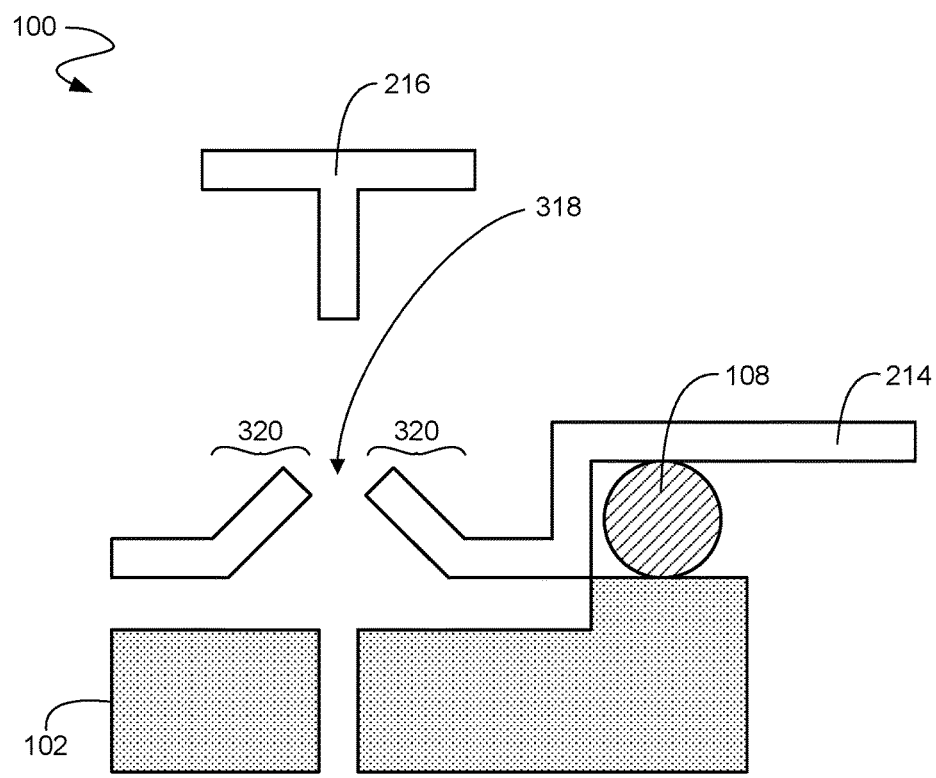
FIG. 3 shows a partial side view of the drive at an intermediate stage of manufacture before the cover is secured to the base according to one aspect of the present embodiments.

Referring now to FIG. 3, a partial side view of the drive 100 at an intermediate stage of manufacture before the cover 214 is secured to the base 102 is shown according to one aspect of the present embodiments. The cover 214 is positioned over the base 102 and over the gasket 108, such that the gasket 108 is between the cover 214 and the base 102. At this stage of manufacture, the gasket 108 is in an initial uncompressed state.

The cover 214 includes a cover fastener hole 318, through which the fastener 216 may be inserted. Surrounding the cover fastener hole 318 is a spring region 320. The spring region 320 is a feature of the cover 214 that is formed in the cover 214. In different embodiments the spring feature may be formed by one or more various manufacturing methods such as (but not limited to) stamping, molding, machining, etching, heating, ablation, etc. At this stage of manufacture, the spring region 320 is uncompressed and extends away from the base 102.

Figure 4:
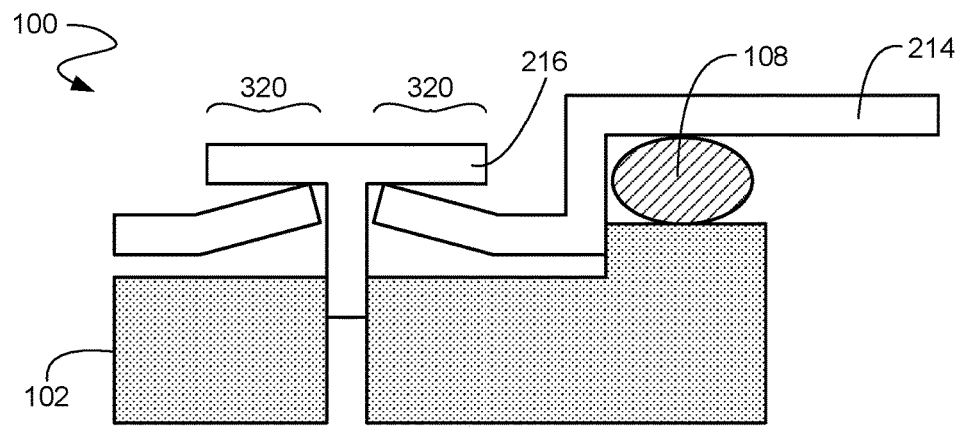
FIG. 4 shows a partial side view of the drive during insertion of the fastener into the base according to one aspect of the present embodiments.

Referring now to FIG. 4, a partial side view of the drive 100 during insertion of the fastener 216 into the base 102 is shown according to one aspect of the present embodiments. At this stage of manufacture, the fastener 216 has begun to be inserted through the cover fastener hole 318 (see also FIG. 3) and into the base 102. The fastener 216 contacts the spring region 320, thereby moving the cover 214 towards contact with the base 102. As such, the spring region 320 surrounds the fastener 216 after insertion of the fastener 216 has begun.

In the present embodiment, the cover 214 has not fully contacted the base 102 yet, and compression of the gasket 108 has begun. As such, the gasket 108 is only partially compressed and has not yet reached a predetermined target compressed height. In some embodiments, the fastener 216 may begin to flatten the spring region 320 at this stage. In further embodiments another external force (e.g. a press, clamp, etc.) may be used to hold the cover 214 and the base 102 together (not shown) while the fastener 216 is being inserted into the base 102.

Figure 5:
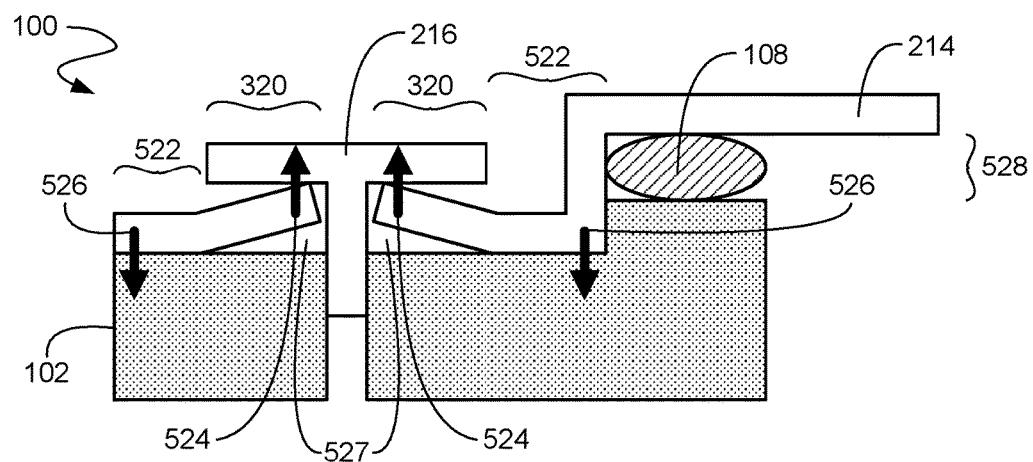
FIG. 5 shows a partial side view of the drive during further insertion of the fastener into the base according to one aspect of the present embodiments.

Referring now to FIG. 5, a partial side view of the drive 100 during further insertion of the fastener 216 into the base 102 is shown according to one aspect of the present embodiments. At this stage of manufacture, the fastener 216 has been inserted to a first position through the cover fastener hole 318 (see also FIG. 3) and further into the base 102. The cover 214 and the base 102 are brought into overlying contact in a contact region 522 surrounding the spring region 320.

In the illustrated embodiment, the spring region 320 of the cover 214 is partially flattened toward the base 102. As such, the spring region 320 (e.g. first region) remains extending away from the base 102 and exerts an upward force 524 (e.g. first force) on the fastener 216. The upward force 524 extends around the fastener 216, uniformly pushing the fastener 216 away from the base 102. As a result of the upward force 524 on the fastener 216, a corresponding opposite downward force 526 (e.g. second force) is exerted on the contact region 522 (e.g. second region), resulting in the overlying contact of the cover 214 and the base 102. The downward force 526 extends around the fastener 216 and the upward force 524, uniformly pushing the cover 214 toward the base 102. The spring region 320 remains stretching away from the base 102 to form a gap 527 between the spring region 320 and the base 102.

Once the insertion of the fastener 216 has brought the cover 214 and the base 102 into contact, the gasket 108 is brought into a final compressed height 528. Therefore, the downward force 526 secures the cover 214 to the base 102 and prevents the gasket 108 from further compression. The final compressed height 528 of the gasket 108 is a predetermined height that has been calculated to meet design criteria, including one or more of, for example (but not limited to), forming a leak proof seal between the cover 214 and the base 102, preventing dislodging of the gasket 108, preventing bulging of the gasket 108, preventing over compression of the gasket 108, etc.

Figure 6:
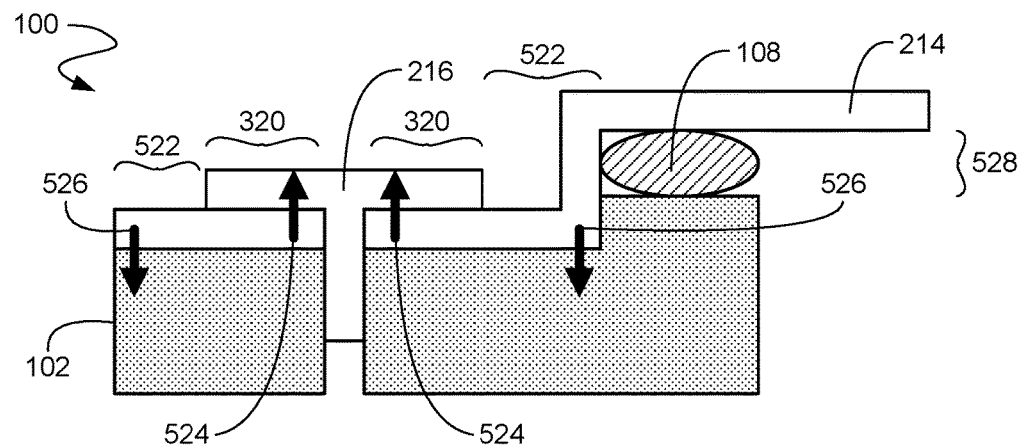
FIG. 6 shows a partial side view of the drive after full insertion of the fastener into the base according to one aspect of the present embodiments.

Referring now to FIG. 6 a partial side view of the drive 100 after full insertion of the fastener 216 into the base 102 is shown according to one aspect of the present embodiments. At this stage of manufacture, the fastener 216 has been further inserted to a second position through the cover fastener hole 318 (see also FIG. 3) and further into the base 102. The spring region 320 is flattened by the further insertion of the fastener 216, which brings the spring region 320 into overlying contact with the base 102. However, as a result of the prior contact between the contact region 522 and the base 102, the final compressed height 528 of the gasket 108 remains the same during this further insertion. It is understood that after the flattening of the spring region 320, the upward force 524 and the downward force 526 remain.

Figure 7:
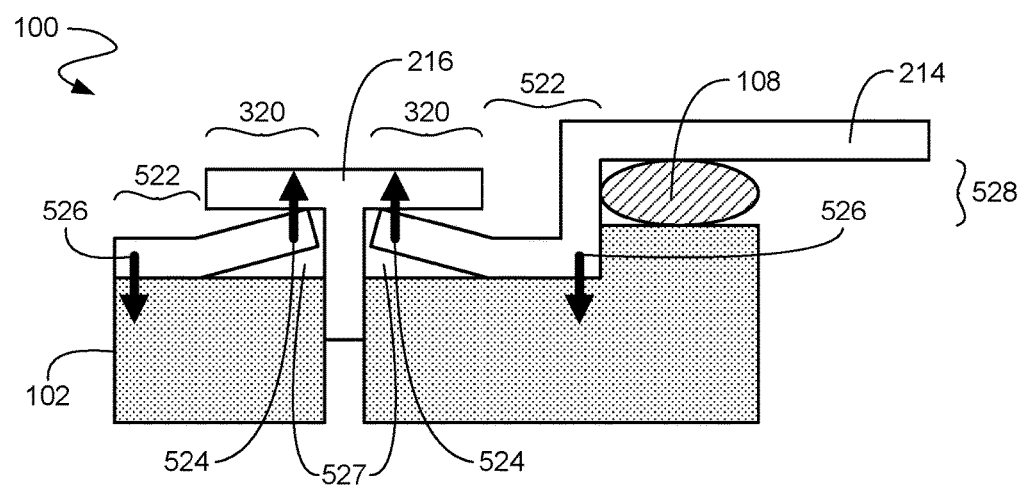
FIG. 7 shows a partial side view of the drive after loosening of the fastener from the base according to one aspect of the present embodiments.

Referring now to FIG. 7 a partial side view of the drive 100 after loosening of the fastener 216 from the base 102 is shown according to one aspect of the present embodiments. As discussed earlier, heating and cooling of the drive 100 results in expansion and contraction of various components that may cause the fastener 216 to loosen to a third position, as illustrated. Loosening of the fastener 216 may result in a dislodged or bulging gasket 108 as a result of separation of the base 102 and the cover 214, an increase in the compressed height 528, and a reduction in compression of the gasket 108.

However, the spring region 320 prevents separation of the base 102 and the cover 214 by maintaining force on the fastener 216 as it loosens, thereby keeping the cover 214 in place and preventing a change in compression of the gasket 108. As illustrated, the spring region 320 extends away from the base 102 and applies the upward force 524 to the loosened fastener 216. As the spring region 320 stretches away from the base 102, the gap 527 forms between the spring region 320 and the base 102. The spring region 320 exerts the upward force 524 on the fastener 216, and the downward force 526 is exerted by the contact region 522 of the cover 214 on the base 102. The contact region 522 and the downward force extend around the spring region 320 causing the cover 214 and the base 102 to remain in overlying contact in the contact region 522 during loosening of the fastener 216. Therefore, the gasket 108 remains compressed, and the compressed height 528 of the gasket 108 remains the same in response to the loosening of the fastener 216.

Figure 8:
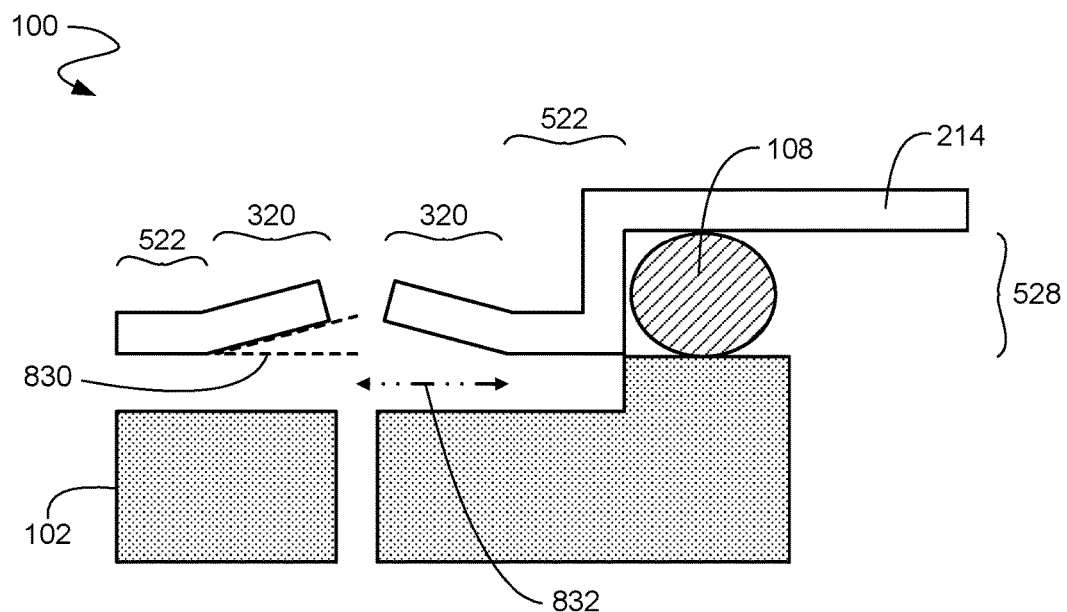
FIG. 8 shows a partial side view of the drive with angle and radius of the spring region according to one aspect of the present embodiments.

Referring now to FIG. 8 a partial side view of the drive 100 with angle 830 and radius 832 of the spring region 320 is shown according to one aspect of the present embodiments. The angle 830 represents how far the spring region 320 extends away from the base 102 before compression by the fastener 216 (not shown, but see previous figures). In addition, the radius 832 represents the length of the spring region 320. According to various embodiments, the strength of the spring region 320 may be controlled by changing the angle 830 and/or the radius 832.

Figure 9:
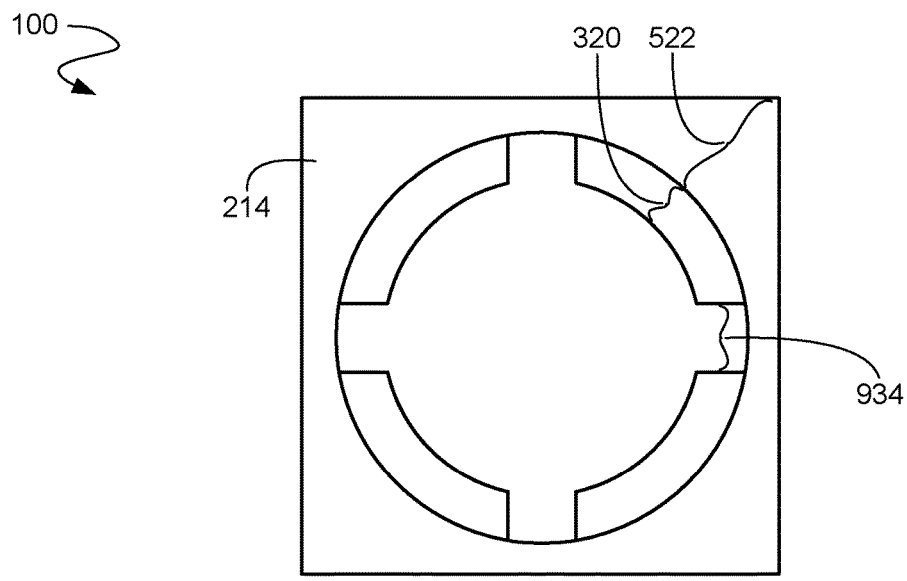
FIG. 9 shows a partial top view of the drive with cutouts in the spring region according to one aspect of the present embodiments.

Referring now to FIG. 9 a partial top view of the drive 100 with cutouts 934 in the spring region 320 is shown according to one aspect of the present embodiments. For clarity of illustration, many elements of the drive 100 previously described are not illustrated, but understood to be present. In various embodiments, the cover 214 may include one or more cutouts 934 in the spring region 320. As such, the strength of the spring region 320 may be controlled by changing the size and/or number of the cutouts 934 in the spring region 320. In various embodiments, the cutouts 934 may be adjusted along with the angle 830 (FIG. 8) and/or the radius 832 (FIG. 8) in order to further control the strength of the spring region 320.

Figure 10A:
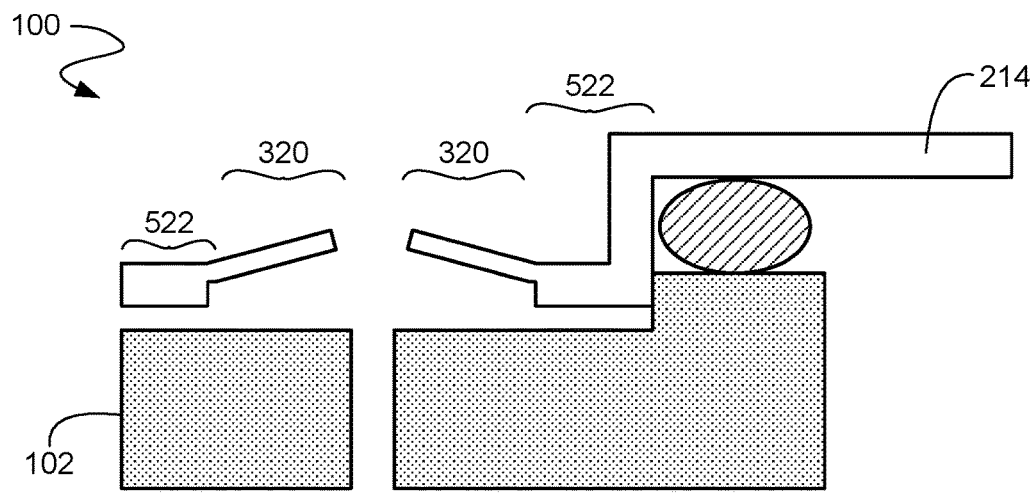
FIGS. 10A and 10B show a partial side view of the drive with coining in the spring region according to one aspect of the present embodiments.
Figure 10B:
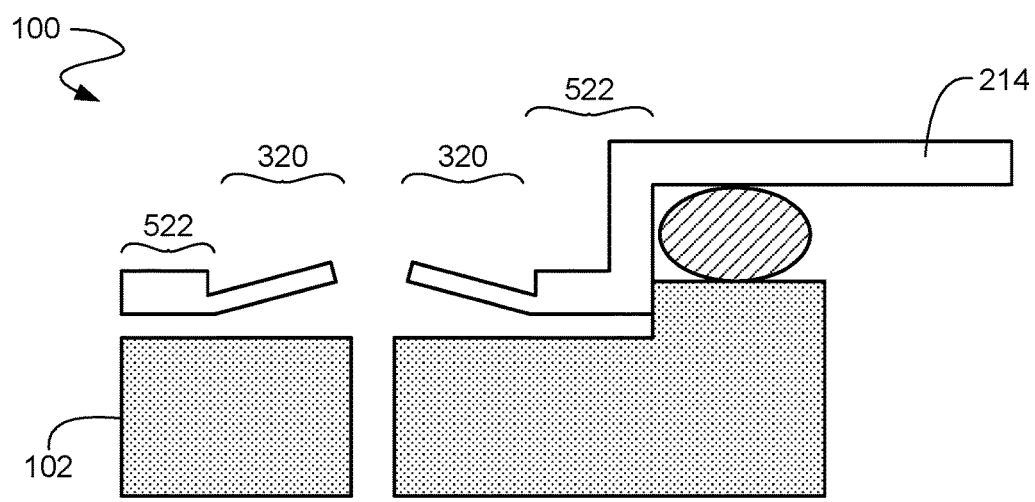

Referring now to FIGS. 10A and 10B a partial side view of the drive 100 with coining in the spring region 320 is shown according to one aspect of the present embodiments. As a result of the coining, the spring region 320 is thinner than the contact region 522 of the cover 214. In various embodiments, the thinner spring region 320 may be positioned at any height in relation to the thicker contact region 522. For example, FIG. 10A illustrates an embodiment wherein the coining has occurred at the top surface of the spring region 320. In addition, FIG. 10B illustrates an embodiment wherein the coining has occurred at the bottom surface of the spring region 320. As such, by controlling the thickness and/or position of the thinner spring region 320, the strength of the spring region 320 may be adjusted. In various embodiments, the coining may be adjusted along with the cutouts 934 (FIG. 9), the angle 830 (FIG. 8) and/or the radius 832 (FIG. 8) in order to further control the strength of the spring region 320.

FIG. 11 shows an exemplary flow diagram according to one aspect of the present embodiments. At block 1102, a cover is positioned over a base and a gasket between the cover and the base, wherein the cover includes a cover fastener hole, and the cover includes a spring region extending away from the base around the cover fastener hole. For example, in FIG. 3 the storage drive cover is positioned over the storage drive base and over the gasket, such that the gasket is between the storage drive cover and the storage drive base. The storage drive cover includes a cover fastener hole, through which the fastener may be inserted. Surrounding the cover fastener hole is a spring region stretching away from the storage drive base.

At block 1104, a fastener is inserted to a first position through the cover fastener hole and into the base, wherein the spring region remains extending away from the base and exerts a force on the fastener, the cover and the base are in overlying contact in a contact region around the spring region, and the inserting compresses the gasket to a compressed height. For example, in FIG. 4 the fastener has begun to be inserted through the cover fastener hole and into the base. The fastener contacts the spring region which remains extending away from the base. The spring region exerts the upward force on the fastener, bringing the cover and base into contact in the contact region surrounding the spring region. After contact is made in the contact region, compression of the gasket stops and the gasket reaches a final compressed height.

At block 1106, the fastener is further inserted to a second position through the cover fastener hole and further into the base, wherein the further inserting flattens the spring region and brings the spring region of the cover into overlying contact with the base, and the compressed height of the gasket remains the same in response to the further inserting. For example, in FIG. 6 the fastener has been further inserted to a second position through the cover fastener hole and further into the base. The spring region is flattened by the further insertion of the fastener, which brings the spring region into overlying contact with the base. However, as a result of the prior contact between the contact region and the base, the final compressed height of the gasket remains the same during this further insertion.

While the embodiments have been described and/or illustrated by means of particular examples, and while these embodiments and/or examples have been described in considerable detail, it is not the intention of the Applicants to restrict or in any way limit the scope of the embodiments to such detail. Additional adaptations and/or modifications of the embodiments may readily appear, and, in its broader aspects, the embodiments may encompass these adaptations and/or modifications. Accordingly, departures may be made from the foregoing embodiments and/or examples without departing from the scope of the concepts described herein. The implementations described above and other implementations are within the scope of the following claims.

What is claimed is:

1. An apparatus comprising:
   a drive base;
   a drive cover overlying the drive base;
   a fastener securing the drive cover to the drive base, wherein the fastener extends through the drive cover and into the drive base;
   a gasket between the drive base and the drive cover, wherein the gasket is compressed by the drive base and the drive cover; and
   a spring feature formed in the drive cover, wherein
      the spring feature exerts a first force on the fastener and a second force on the base,
      the spring feature exerts the first force in a first region surrounding the fastener,
      the spring feature exerts the second force in a second region surrounding the first region, and
      the first force is opposite the second force.

2. The apparatus of claim 1, wherein the second force prevents the gasket from further compression.

3. The apparatus of claim 1, wherein the spring feature is a first region of the drive cover that is thinner than a second region of the drive cover.

4. The apparatus of claim 1, wherein the spring feature includes cutouts.

5. The apparatus of claim 1, wherein the gasket surrounds a disc pack assembly.

6. An apparatus comprising:
a storage device cover overlying a storage device base;
a first region of a spring feature in the storage device cover exerting a first force on a loosened fastener, wherein
the first region extends around the loosened fastener, and
the first region stretches away from the storage device base to form a gap between the first region and the storage device base, wherein the spring feature exerts the first force on the loosened fastener;
a second region of the spring feature in the storage device cover exerting a second force on the storage device base, wherein
the first force and the second force are in opposing directions,
the second region extends around the first region, and
the second region is in overlying contact with the storage device base; and
a gasket between the second region and a storage device, wherein the gasket is compressed by the storage device cover and the storage device base.

7. The apparatus of claim 6, wherein the second region prevents the gasket from further compression.

8. The apparatus of claim 6, wherein the fastener is a screw.

9. The apparatus of claim 6, wherein the first region is thinner than the second region.

10. The apparatus of claim 6, wherein the first region is thinner than the second region.

11. The apparatus of claim 6, wherein the first region includes cutouts.

12. A method comprising:
positioning a cover over a base and a gasket between the cover and the base, wherein
the cover includes a cover fastener hole, and
the cover includes a spring region extending away from the base around the cover fastener hole;
inserting a fastener to a first position through the cover fastener hole and into the base, wherein
the spring region remains extending away from the base and exerts a first force on the fastener,
the cover and the base are in overlying contact in a contact region around the spring region, and
the inserting compresses the gasket to a compressed height; and
further inserting the fastener to a second position through the cover fastener hole and further into the base, wherein
the further inserting flattens the spring region and brings the spring region of the cover into overlying contact with the base,
the spring feature exerts a second force on the base,
the spring feature exerts the first force in a first region surrounding the fastener,
the spring feature exerts the second force in a second region surrounding the first region, and
the compressed height of the gasket remains the same in response to the further inserting.

13. The method of claim 12, further comprising loosening the fastener to a third position, wherein
the spring region extends away from the base, and
in response to the first force exerted by the spring region on the fastener, the cover and the base remain in overlying contact in the contact region during the loosening of the fastener to the third position.

14. The method of claim 13, wherein the compressed height of the gasket remains the same in response to the loosening.

15. The method of claim 13, wherein the loosening is in response to heat.

16. The method of claim 12, wherein the spring region is thinner than the contact region.

17. The method of claim 12, wherein the gasket surrounds a disc pack assembly.

* * * * *